(12) United States Patent
Ono et al.

(10) Patent No.: US 12,359,990 B2
(45) Date of Patent: Jul. 15, 2025

(54) STRAIN GAUGE

(71) Applicant: MINEBEA MITSUMI Inc., Nagano (JP)

(72) Inventors: Aya Ono, Nagano (JP); Yosuke Ogasa, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/861,732

(22) PCT Filed: Apr. 27, 2023

(86) PCT No.: PCT/JP2023/016698
§ 371 (c)(1),
(2) Date: Oct. 30, 2024

(87) PCT Pub. No.: WO2023/214537
PCT Pub. Date: Nov. 9, 2023

(65) Prior Publication Data
US 2025/0172444 A1 May 29, 2025

(30) Foreign Application Priority Data

May 2, 2022 (JP) .................................. 2022-076117

(51) Int. Cl.
*G01L 1/22* (2006.01)
(52) U.S. Cl.
CPC .................................. *G01L 1/2287* (2013.01)
(58) Field of Classification Search
None
See application file for complete search history.

(56) References Cited

U.S. PATENT DOCUMENTS

| 11,326,967 | B2 * | 5/2022 | Toda ...................... G01D 21/02 |
| 2021/0033476 | A1 | 2/2021 | Toda et al. |

(Continued)

FOREIGN PATENT DOCUMENTS

| JP | H04-274703 | 9/1992 |
| JP | 2016-074934 | 5/2016 |

(Continued)

OTHER PUBLICATIONS

Written Opinion of the International Searching Authority for PCT/JP2023/016698 mailed on Jul. 11, 2023.

(Continued)

*Primary Examiner* — Peter J Macchiarolo
*Assistant Examiner* — Jermaine L Jenkins
(74) *Attorney, Agent, or Firm* — IPUSA, PLLC (57) ABSTRACT

A strain gauge includes a substrate, a resistor formed on the substrate, and two lines. The resistor includes multiple elongated portions. Each of the lines includes a first metal layer and a second metal layer that is laminated on the first metal layer and is formed of a material having lower volume resistivity than the first metal layer. In plan view, an outer edge of the first metal layer is exposed from the second metal layer. In plan view, an end of the second metal layer on a first end side in a first direction protrudes further toward the first end side in the first direction than an end of a space that is situated between the first metal layer and an elongated portion adjacent to the first metal layer.

8 Claims, 6 Drawing Sheets

(56) References Cited

U.S. PATENT DOCUMENTS

2023/0375325 A1    11/2023  Ogasa et al.
2023/0400370 A1*   12/2023  Takimoto .............. G01L 1/2287

FOREIGN PATENT DOCUMENTS

| | | |
|---|---|---|
| JP | 2021-156815 | 10/2021 |
| WO | 2019/151345 | 8/2019 |
| WO | 2022/080421 | 4/2022 |

OTHER PUBLICATIONS

International Search Report of PCT/JP2023/016698 mailed on Jul. 11, 2023.

\* cited by examiner

STRAIN GAUGE

TECHNICAL FIELD

The present invention relates to a strain gauge.

BACKGROUND

The use of strain gauges has been known for adhering to objects to be measured. A strain gauge includes resistors that detects strain, and the resistors are formed, for example, on an insulating resin. The resistors are connected to electrodes, for example, via lines (for example, see Patent Document 1).

RELATED-ART DOCUMENTS

Patent Documents

Patent Document 1: Japanese Unexamined Patent Application Publication No. 2016-74934

SUMMARY

Problem to be Solved by the Invention

The strain gauge is attached to a flexure element. The strain gauge expands and contracts in accordance with the movement of the flexure element to thereby detect strain of the flexure element. In this arrangement, in order to detect greater strain levels, the strain gauge itself must be able to withstand the process of expansion and contraction without becoming damaged, and a greater strain limit is required.

In view of the above point, an object of the present invention is to improve a strain limit of a strain gauge.

Means for Solving the Problem

A strain gauge according to one embodiment of the present disclosure includes a substrate, a resistor formed on the substrate, and two lines formed on the substrate and coupled in series to both ends of the resistor. The resistor includes multiple elongated portions, whose longitudinal directions are aligned with a first direction and which are coupled in series with each other, are arranged side by side. One of the lines is disposed parallel to a given elongated portion, among the multiple elongated portions, that is located at one end in a second direction perpendicular to the first direction. The one line is coupled to one end of the given elongated portion in the first direction. The other of the lines is disposed parallel to a given elongated portion, among the multiple elongated portions, that is located at the other end in the second direction. The other line is coupled to one end of the given elongated portion in the first direction. Each of the lines includes a first metal layer and a second metal layer that is laminated on the first metal layer and is formed of a material having lower volume resistivity than the first metal layer. In plan view, an outer edge of the first metal layer is exposed from the second metal layer. In plan view, an end of the second metal layer on one end side in the first direction protrudes further toward the one end side in the first direction than an end of a space that is situated between the first metal layer and the elongated portion adjacent to the first metal layer.

Effects of the Invention

In a disclosed technique, a strain limit of a strain gauge can be improved.

MODE FOR CARRYING OUT THE INVENTION

Hereinafter, embodiments for carrying out the invention will be described with reference to the drawings. In each drawing, the same components may be denoted by the same numerals. In the description for each of the drawings, description of the same components as those already described may be omitted. In each drawing, an X-axis, a Y-axis, and a Z-axis that are orthogonal to one another may be defined. In this case, in an X-axis direction, a starting point (initial point) side of an arrow may be referred to as a −X side, and an ending point (terminal point) side of the arrow may be referred to as a +X side. The same condition as the X-axis direction applies to each of a Y-axis direction and a Z-axis direction. In addition, a direction parallel to the X-axis may be referred to as a first direction X, and a direction parallel to the Y-axis may be referred to as a second direction Y.

First Embodiment

Figure 1:
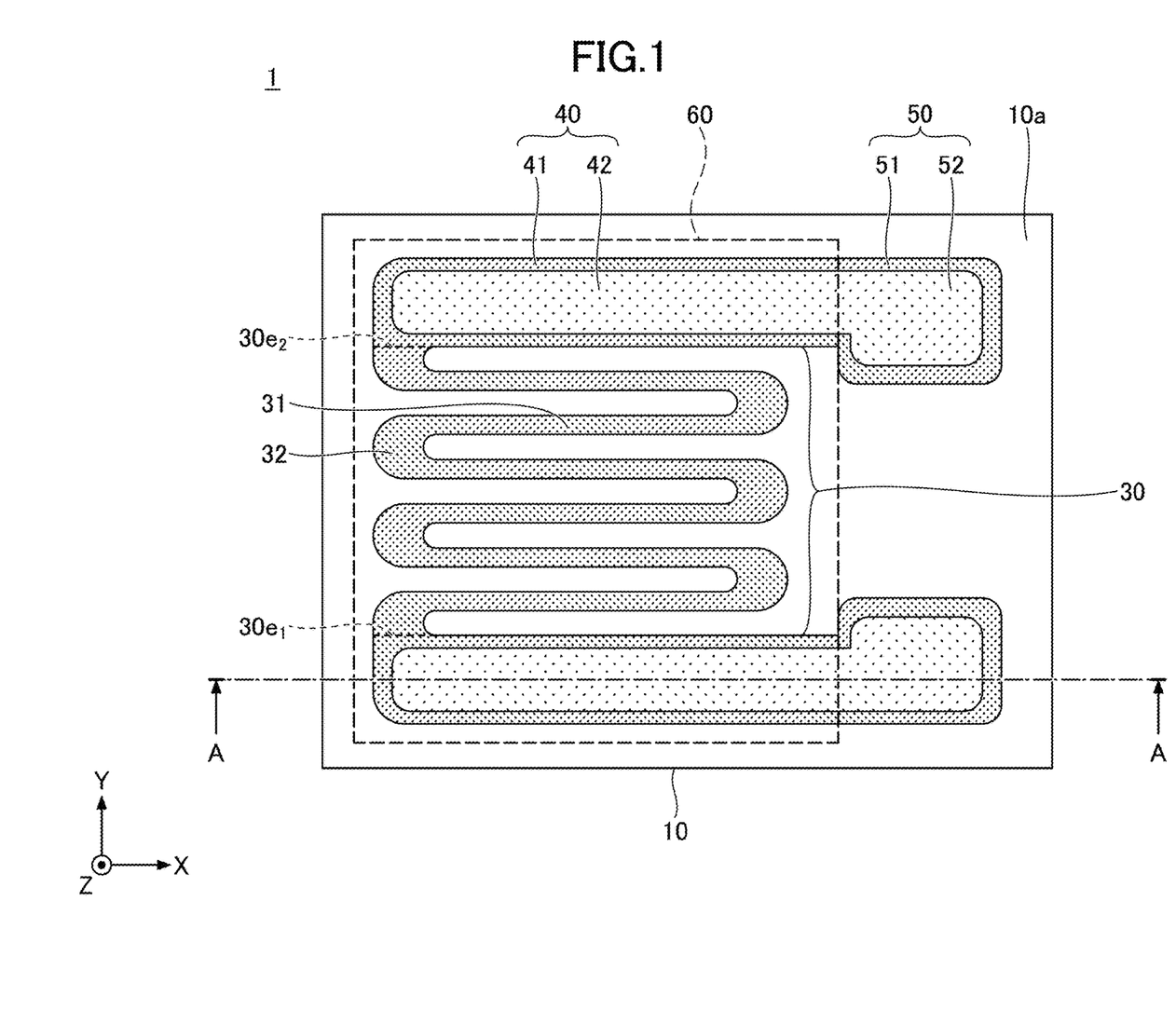
FIG. 1 is a plan view illustrating a strain gauge according to a first embodiment.
Figure 2:
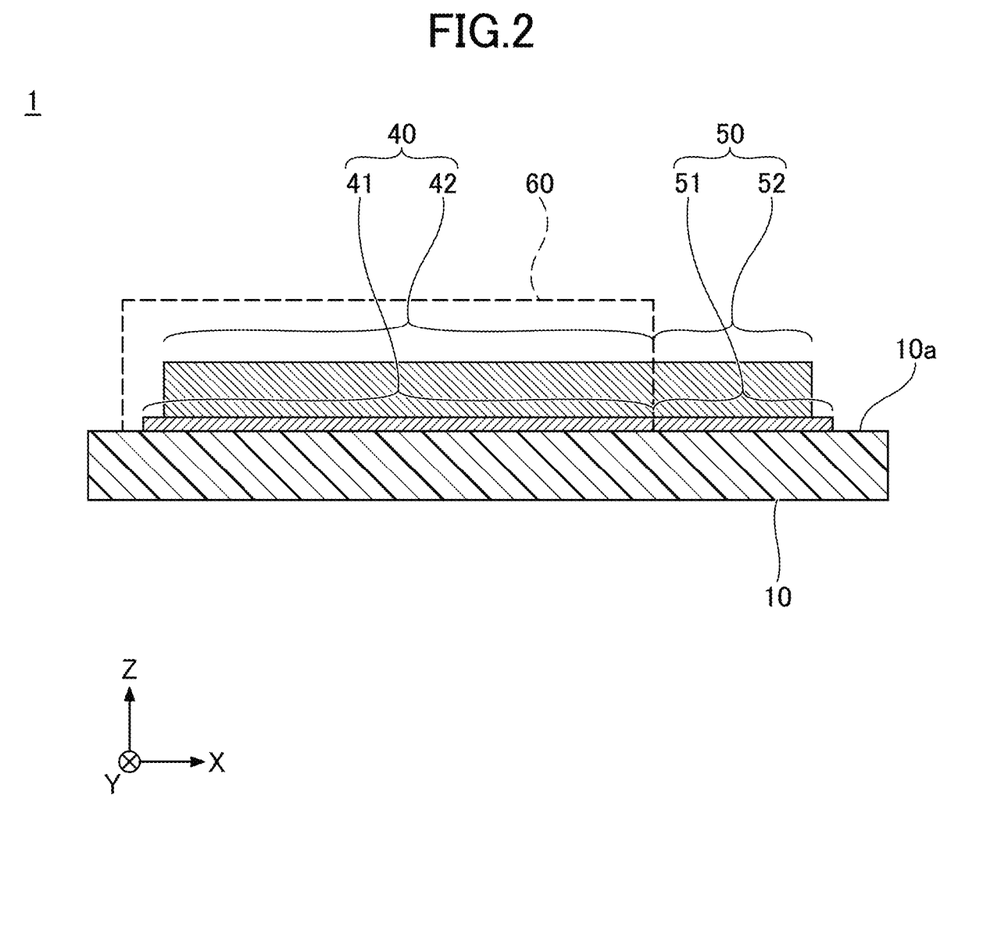
FIG. 2 is a cross-sectional view (part 1) illustrating the strain gauge according to the first embodiment.

FIG. 1 is a plan view illustrating a strain gauge according to a first embodiment. FIG. 2 is a sectional view (part 1) illustrating the strain gauge according to the first embodiment, and is a sectional view taken along the line A-A in FIG. 1.

Referring to FIGS. 1 and 2, a strain gauge 1 includes a substrate 10, a resistor 30, lines 40, electrodes 50, and a cover layer 60. The cover layer 60 can be provided as needed. In FIGS. 1 and 2, only an outer edge of the cover layer 60 is indicated by a broken line for convenience. Components constituting the strain gauge 1 will be described in detail as follows.

In the present embodiment, for convenience, a side of the strain gauge 1 where the resistor 30 of the substrate 10 is provided will be referred to as an "upper side," and a side of the strain gauge 1 where the resistor 30 is not provided will be referred to as a "lower side." Further, a surface located on the upper side of each component will be referred to as an "upper surface," and a surface located on the lower side of each component will be referred to as a "lower surface." However, the strain gauge 1 can be used in a state of being upside down. The strain gauge 1 can be also arranged at an arbitrary angle. A plan view refers to viewing an object in a direction that is normal to an upper surface 10a of the substrate 10 and that is from the upper side to the lower side. A plan shape refers to a shape of an object when the object is viewed in the above normal direction.

The substrate 10 serves as a base layer for forming the resistor 30 and the like. The substrate 10 is flexible. The thickness of the substrate 10 is not particularly limited, and may be suitably determined according to the purpose or the like of use of the strain gauge 1. For example, the thickness of the substrate 10 may be approximately 5 μm to 500 μm. A flexure element may be bonded to the lower surface of the strain gauge 1 via an adhesive layer or the like.

In view of the transmissibility of strain from a flexure element surface to a sensitive portion and of dimensional stability against environmental changes, the thickness of the substrate 10 is preferably in the range of 5 μm to 200 μm. In view of the insulation, the thickness of the substrate 10 is preferably 10 μm or more.

The substrate 10 is formed of, for example, an insulating resin film such as a polyimide (PI) resin, an epoxy resin, a polyetheretherketone (PEEK) resin, a polyethylene naphthalate (PEN) resin, a polyethylene terephthalate (PET) resin, a polyphenylene sulfide (PPS) resin, a liquid crystal polymer (LCP) resin, a polyolefin resin, or the like. The film refers to a flexible member having a thickness of about 500 μm or less.

When the substrate 10 is formed of an insulating resin film, the insulating resin film may contain fillers, impurities, or the like. For example, the substrate 10 may be formed of an insulating resin film containing fillers such as silica and alumina.

Examples of the material other than the resin of the substrate 10 include crystalline materials such as $SiO_2$, $ZrO_2$ (including YSZ), Si, $Si_3N_4$, $Al_2O_3$ (including sapphire), ZnO, and perovskite ceramics ($CaTiO_3$ and $BaTiO_3$). In addition to the crystalline materials described above, amorphous glass or the like may be used as the material of the substrate 10. As the material of the substrate 10, a metal such as aluminum, an aluminum alloy (duralumin), or titanium may be used. When the metal is used, an insulating film is provided on the substrate 10 made of a metal.

The resistor 30 is a thin film formed in a predetermined pattern on the substrate 10. In the strain gauge 1, the resistor 30 is a sensitive portion of which resistance changes upon receiving strain. The resistor 30 may be formed directly on the upper surface 10a of the substrate 10, or may be formed on the upper surface 10a of the substrate 10 via other layer(s). In FIG. 1, the resistor 30 is illustrated in a matte-finish pattern having a high density for convenience.

The resistor 30 includes a plurality of elongated portions 31 and a plurality of folded portions 32. In the example of FIG. 1, the resistor 30 includes six elongated portions 31 and seven folded portions 32, but the number of each of the elongated portions 31 and the folded portions 32 is not limited to the example of FIG. 1.

In the resistor 30, the elongated portions 31, whose longitudinal directions are aligned with a first direction X, are arranged side by side. The folded portions 32 are coupled in series by alternately joining the ends of adjacent elongated portions 31 among the plurality of elongated portions 31. In this arrangement, the resistor 30 as a whole has a folded zigzag structure. The first direction X, which is a longitudinal direction of each of the plurality of elongated portions 31, refers to a grid direction. The second direction Y, which is a direction perpendicular to the grid direction, refers to a grid width direction.

In the resistor 30, one end (−X side end) of a given elongated portion 31, in the first direction X, that is located at one end (−Y side end) in the second direction Y, bends in the −Y direction, and the one end of the given elongated portion 31 reaches one end $30e_1$ of the resistor 30 in the grid width direction. In addition, one end (−X side end) of a given elongated portion 31, in the first direction X, that is located at the other end (+Y side end) in the second direction Y, bends in the +Y direction, and one end (−X side end) of a given elongated portion 31 reaches the other end $30e_2$ in the grid direction. The ends $30e_1$ and $30e_2$ are electrically connected to the electrodes 50 via the lines 40, respectively. In other words, the lines 40 electrically connect the ends $30e_1$ and $30e_2$ of the resistor 30 in the grid width direction, to the electrodes 50, respectively. Although the ends $30e_1$ and $30e_2$ are indicated by broken lines in FIG. 1 for convenience, the resistor 30 and first metal layers 41 (described later) in the lines 40 can be integrally formed.

The resistor 30 can be formed of, for example, a material including Cr (chromium), a material including Ni (nickel), or a material including both Cr and Ni. That is, the resistor 30 can be formed of a material including at least one of Cr or Ni. The material including Cr includes, for example, a Cr composite film. The material including Ni includes, for example, Cu—Ni (copper-nickel). The material including both Cr and Ni includes, for example, Ni—Cr (nickel-chromium).

Here, the Cr composite film is a composite film of Cr, CrN, and $Cr_2N$, and the like. The Cr composite film may include incidental impurities such as chromium oxide.

The thickness of the resistor 30 is not particularly limited, and may be suitably determined according to the purpose or the like of use of the strain gauge 1. For example, the thickness of the resistor 30 may be approximately 0.05 μm to 2 μm. In particular, when the thickness of the resistor 30 is 0.1 μm or more, crystallinity (example, crystallinity of α-Cr) of a crystal that constitutes the resistor 30 is improved. When the thickness of the resistor 30 is 1 μm or less, (i) cracks in the film, and (ii) warpage of the film from the substrate 10, caused by internal stress of the film that constitutes the resistor 30 are reduced.

In consideration of preventing lateral sensitivity from occurring and taking measures against disconnection, the width of each elongated portion 31 in the resistor 30 is preferably greater than or equal to 5 μm and less than or equal to 100 μm. More specifically, the width of each elongated portion 31 in the resistor 30 is preferably greater than or equal to 5 μm and less than or equal to 70 μm, and more preferably greater than or equal to 5 μm and less than or equal to 50 μm.

For example, when the resistor 30 is a Cr composite film, the stability of the gauge factor can be improved by using α-Cr (alpha chromium), which has a stable crystal phase, as a main component. For example, when the resistor 30 is the Cr composite film, in a case where the resistor 30 is formed with α-Cr as the main component, the gauge factor of the strain gauge 1 can be set to 10 or more, and a gauge factor temperature coefficient TCS and a temperature coefficient of resistance TCR can be each set to be in the range of −1000 ppm/° C. to +1000 ppm/° C. Here, the "main component" means a component at 50 wt. % or more all materials constituting the resistor. From the viewpoint of improving the gauge factor, the resistor 30 preferably includes α-Cr at 80 wt. % or more. Further, from this viewpoint, it is more preferable that the resistor 30 includes α-Cr at 90 wt. % or more. The α-Cr is Cr having a bcc structure (body-centered cubic lattice structure).

When the resistor 30 is the Cr composite film, CrN and Cr—N included in the Cr composite film are preferably at 20 wt. % or less. When CrN and Cr—N included in the Cr composite film are at 20 wt. % or less, it is possible to suppress the decrease in the gauge factor of the strain gauge 1.

It is preferable that a ratio of CrN to Cr—N in the Cr composite film is greater than or equal to 80 wt. % and less than 90 wt. % with respect to a total weight of CrN and $Cr_2N$. More preferably, the ratio is greater than or equal to 90 wt. % and less than 95 wt. % with respect to the total weight of CrN and Cr—N. $Cr_2N$ has a semiconductor characteristic. Therefore, when a percentage of $Cr_2N$ is greater than or equal to 90 wt. % and less than 95 wt. %, a decrease in TCR (negative TCR) becomes more remarkable. In addition, when the percentage of $Cr_2N$ is greater than or equal to 90 wt. % and less than 95 wt. %, a ceramic portion of the resistor 30 is reduced, and a brittle fracture of the resistor 30 is unlikely to occur.

On the other hand, CrN has an advantage of being chemically stable. By including more CrN in the Cr composite film, it is possible to reduce the possibility of generating unstable N, so that a stable strain gauge can be obtained. Here, the "unstable N" means a small amount of $N_2$ or atomic N that may exist in the film of the Cr composite film. The unstable N may escape out of the film depending on an external environment (for example, a high temperature environment). When the unstable N escapes out of the film, film stress on the Cr composite film may change.

When the Cr composite film is used as the material of the resistor 30 in the strain gauge 1, high sensitivity can be provided and the strain gauge 1 can be made compact. For example, while the output of a conventional strain gauge is about 0.04 mV/2 V, the output of 0.3 mV/2 V or more can be obtained in a case where the Cr composite film is used as the material of the resistor 30. In addition, while the size (gauge length×gauge width) of the conventional strain gauge is about 3 mm×3 mm, the size (gauge length×gauge width) of the strain gauge can be reduced to about 0.3 mm×0.3 mm in a case where the Cr composite film is used as the material of the resistor 30.

Two lines 40 are formed on the substrate 10. One line of the lines 40 is disposed parallel to a given elongated portion 31 that is located at one end (−Y side end) in the second direction Y, and the one line 40 is connected to one end (−X side end) of the given elongated portion 31 in the first direction X via a given folded portion 32. The other of the lines 40 is disposed parallel to a given elongated portion 31 that is located at the other end (+Y side end) in the second direction Y, and the other line 40 is connected to one end (−X side end) of the given elongated portion 31 in the first direction X via a given folded portion 32.

It is sufficient when each line 40 is disposed parallel to a given elongated portion 31 on at least one end side in the first direction X. The entire line 40 may not be disposed parallel to a given elongated portion 31. That is, the line 40 is not limited to a straight line, and can have any pattern that is placed parallel to the elongated portion 31 on at least one end side in the first direction X. Each line 40 can have any length.

The electrodes 50 are formed on the substrate 10, and are electrically connected to the resistor 30 via the respective lines 40. Each electrode 50 is, for example, formed to have a substantially rectangular shape that is wider than the line 40. The electrodes 50 are used as a pair of electrodes for externally outputting a change in a resistance value of the resistor 30 due to strain, and for example, a lead wire or the like for an external connection is bonded.

Each line 40 includes a first metal layer 41 and a second metal layer 42 laminated on the first metal layer 41. Each electrode 50 includes a first metal layer 51 and a second metal layer 52 laminated on the first metal layer 51. Respective first metal layers 51 are electrically connected to ends $30e_1$ and $30e_2$ of the resistor 30 via first metal layers 41 of the lines 40. The first metal layer 51 is formed to have a substantially rectangular shape in plan view. The first metal layer 51 may be formed in the same width as the line 40. In FIG. 1, for convenience, the first metal layers 41 and 51 are illustrated in a matte finish having the same density as the resistor 30, and the second metal layers 42 and 52 are illustrated in a matte finish having a lower density than the resistor 30.

The second metal layers 42 and 52 are respectively formed on portions of upper surfaces of the first metal layers 41 and 51. Specifically, the second metal layers 42 and 52 are formed in regions excluding outer edges of the upper surfaces of the first metal layers 41 and 51. In this arrangement, in plan view, an outer edge of the first metal layer 41 is exposed from each second metal layer 42. Also, in plan view, an outer edge of the first metal layer 51 is exposed from each second metal layer 52.

The second metal layer 42 and the second metal layer 52 may be integrally formed of the same material, or may be formed of different materials. As the material of the second metal layers 42 and 52, a material having volume resistivity that is lower than that of the resistor 30 (the first metal layers 41 and 51) can be selected. Examples of such a material include, for example, Cu, Ni, Al, Ag, Au, Pt, or the like; an alloy of any of these metals; a compound of any of these metals; or a laminated film in which any of these metals, alloys, and compounds are appropriately laminated. In particular, as the material of the second metal layers 42 and 52, it is preferable to use Cu, a Cu alloy, Al, Ag, Au, CrMn, or the like. The thicknesses of the second metal layers 42 and 52 are not particularly limited, and can be suitably selected according to the purpose. The respective thicknesses of the second metal layers 42 and 52 may be, for example, approximately 0.5 μm to 5 μm.

One or more other metal layers may be further laminated on the upper surface of the second metal layer 52. For example, the second metal layer 52 is a copper layer and a gold layer may be laminated on the upper surface of the copper layer. Alternatively, the second metal layer 52 is a copper layer, and a palladium layer and a gold layer may be sequentially laminated on the upper surface of the copper layer. By using a gold layer as an uppermost layer of each electrode 50, solder wettability of the electrode 50 can be improved.

Although the resistor 30, the first metal layer 41, and the first metal layer 51 are denoted by different numerals for convenience, they can be integrally formed by the same material in the same process. In this arrangement, the resistor 30, the first metal layer 41, and the first metal layer 51 may have substantially the same thickness. Also, although the second metal layer 42 and the second metal layer 52 are denoted by different numerals for convenience, they can be integrally formed of the same material in the same process. In this arrangement, the second metal layer 42 and the second metal layer 52 may have substantially the same thickness.

With this arrangement, each line 40 has a structure in which the second metal layer 42 formed of a material having volume resistivity lower than that of the first metal layer 41 is laminated on the first metal layer 41, which is made of the same material as the resistor 30. In this arrangement, the resistance of the line 40 becomes less than that of the resistor 30, thereby reducing the likelihood of the line 40 to function as a resistor. As a result, strain detection accuracy by the resistor 30 can be improved.

In other words, by forming the lines 40 using the material having volume resistivity lower than that of the resistor 30, a substantially sensitive portion of the strain gauge 1 can be limited to a local region where the resistor 30 is formed. As a result, strain detection accuracy by the resistor 30 can be improved.

In particular, in a highly sensitive strain gauge having a gauge factor of 10 or more and using a Cr composite film as the resistor 30, when the lines 40 are set to have a lower resistance than the resistor 30 so as to limit the substantially sensitive portion to a local region where the resistor 30 is formed, this provides a remarkable effect on improvement of the strain detection accuracy. Also, when the lines 40 are set to have the lower resistance than the resistor 30, this provides an effect of reducing the lateral sensitivity.

The cover layer 60 (protective layer) is provided on and above the upper surface 10a of the substrate 10 as necessary, so as to cover the resistor 30 and the lines 40 and expose the electrodes 50. The material of the cover layer 60 may include, for example, an insulating resin, such as a PI resin, an epoxy resin, a PEEK resin, a PEN resin, a PET resin, a PPS resin, or a composite resin (for example, a silicone resin or a polyolefin resin). The cover layer 60 may contain fillers or pigments. The thickness of the cover layer 60 is not particularly limited and can be suitably selected according to the purpose. For example, the thickness of the cover layer 60 may be approximately 2 μm to 30 μm. By providing the cover layer 60, the occurrence of mechanical damage or the like to the resistor 30 can be suppressed. Further, by providing the cover layer 60, the resistor 30 can be protected from moisture or the like.

Figure 3:
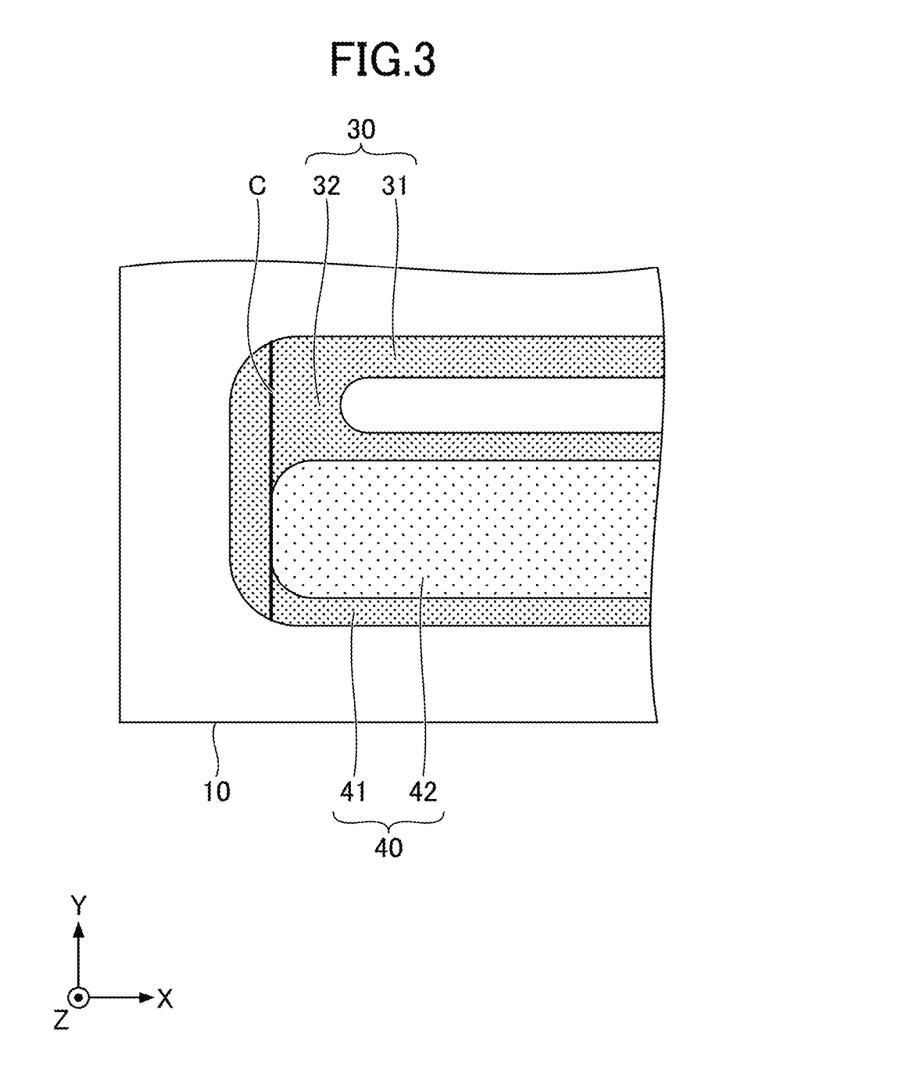
FIG. 3 is a diagram schematically illustrating a state in which a crack is formed in a resistor and a line.

FIG. 3 is a diagram schematically illustrating a state in which a crack is formed in the resistor and the line. As the strain applied to the strain gauge 1 increases, a crack forms in the resistor 30 and the first metal layer 41. According to the study by the inventors, as illustrated in FIG. 3, a crack C tends to form in the vicinity of the end of the second metal layer 42, in the first direction X, that constitutes part of the line 40 so as to extend approximately in the second direction Y.

Figure 4:
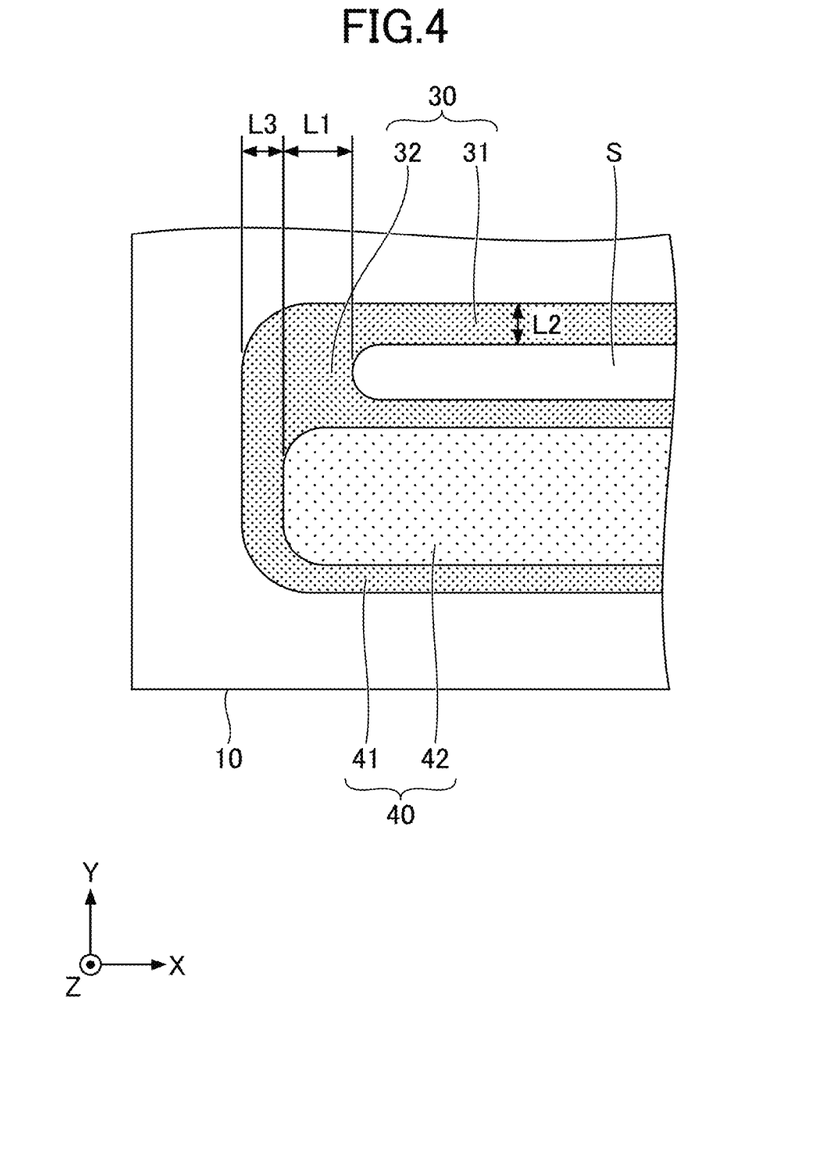
FIG. 4 is a partially enlarged plan view of the vicinity of a connection between the resistor and the line in FIG. 1.

FIG. 4 is a partially enlarged plan view of the vicinity of a connection between the resistor and the line in FIG. 1. As illustrated in FIG. 4, in the strain gauge 1, in plan view, the end of the second metal layer 42 on one end side (−X side) in the first direction X protrudes further toward the one end side (−X side) in the first direction X than an end of a space S, on the one end side (−X side) in the first direction X, that is situated between the first metal layer 41 and the elongated portion 31 that is adjacent to the first metal layer 41. That is, when a length by which the end of the second metal layer 42 on the one end side in the first direction X protrudes toward the one end side in the first direction X, with reference to the end of the space S on the one end side in the first direction X, is expressed by L1, the length L1>0 is satisfied. In the strain gauge 1, in the plan view, a positional relationship between the end of the second metal layer 42 on the one end side in the first direction X, and an end of a space between adjacent elongated portions 31 on one end side in the first direction X may set as desired.

Figure 5:
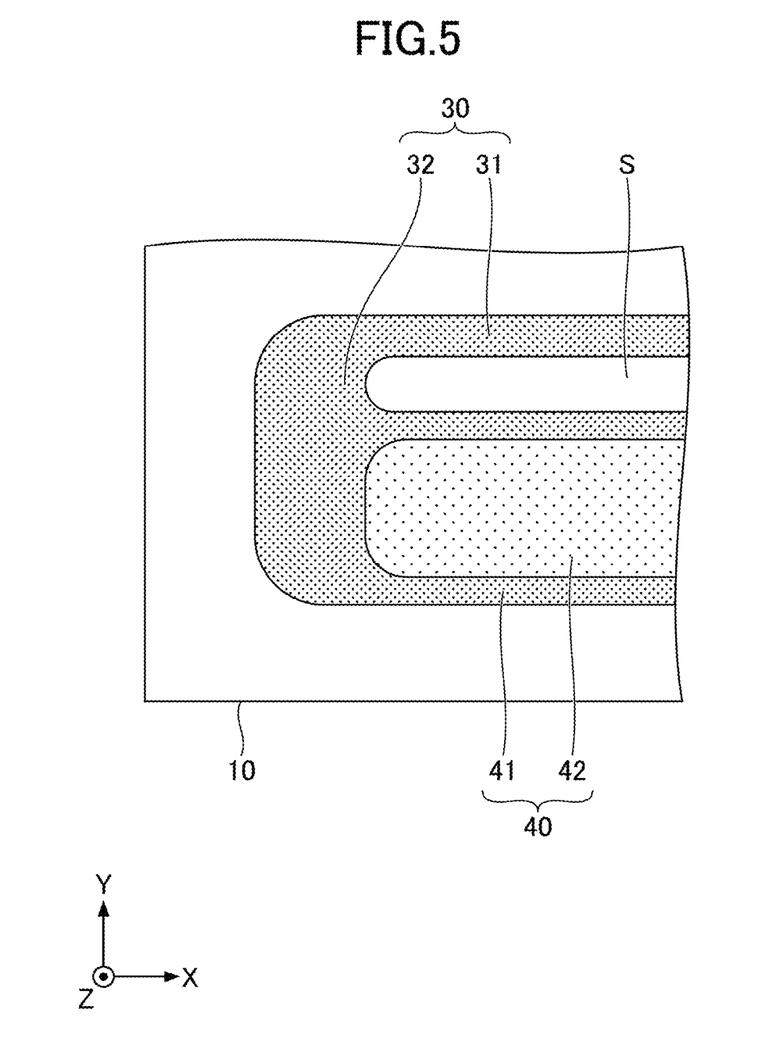
FIG. 5 is a partially enlarged plan view of the vicinity of the connection between the resistor and the line in the strain gauge in a comparative example.

FIG. 5 is a partially enlarged plan view of the vicinity of the connection between the resistor and the line in the strain gauge in a comparative example. In the comparative example of FIG. 5, the length L1 illustrated in FIG. 4 is zero. That is, in the comparative example of FIG. 5, in the first direction X, an end of the second metal layer 42 on one end side in the first direction X is at the same position as the end of the space S on the one end side in the first direction X. In this case, if the crack C as illustrated in FIG. 3 is formed, the line 40 and the elongated portion 31 adjacent to the line 40 are disconnected and thus the current stops flowing. As a result, the strain gauge in the comparative example ceases to function as a strain gauge.

On the other hand, in the strain gauge 1 illustrated in FIG. 4, the length L1>0 is satisfied. In this case, even if the crack C as illustrated in FIG. 3 is formed, an electrical connection is maintained without disconnection between the line 40 and the elongated portion 31 adjacent to the line 40, and as a result, the strain gauge can continue to function as the strain gauge. In FIG. 4, the length L1 is preferably 1 μm or more. In this arrangement, the electrical connection is easily maintained while securing a conduction width between the line 40 and the elongated portion 31 that is adjacent to the line 40.

In FIG. 4, the length L1 is more preferably equal to or greater than a length L2 (that is, the width of the elongated portion 31) of the elongated portion 31 in the second direction Y. The length of the elongated portion 31 in the second direction Y is preferably 5 μm or more. That is, the length L1 is more preferably 5 μm or more. As a result, the conduction width between the line 40 and the elongated portion 31 that is adjacent to the line 40 is further secured, and the electrical connection is more easily maintained.

In FIG. 4, a length L3 in the first direction X between the end of the first metal layer 41 on one end side in the first direction X and the end of the second metal layer 42 on one end side in the first direction X is preferably 5 μm or more, and more preferably 10 μm or more.

In a manufacturing process of the strain gauge 1, a first metal layer 41 and a second metal layer 42 are etched and patterned, and the first metal layer 41 may be over-etched compared to the second metal layer 42, during etching. If the end of the second metal layer 42 protrudes in the horizontal direction from the end of the first metal layer 41 due to over-etching, the adhesion between the line 40 and the cover layer 60 would decrease when the cover layer 60 covering the line 40 is provided. For example, in the line 40, if the first metal layer 41 is formed of a Cr composite film and the second metal layer 42 is formed of copper, the Cr composite film is over-etched by about 1 μm to 2 μm in comparison with the copper, during the etching in the manufacturing process of the strain gauge 1. If the end of the second metal layer 42 protrudes in the horizontal direction from the end of the first metal layer 41 due to over-etching, in a case where for example, the second metal layer 42 is formed of copper, a portion where the copper protrudes oxidizes, and thus the copper degrades. As a result, the reliability of the strain gauge 1 would decrease.

Therefore, in plan view, the outer edge of the first metal layer 41 is preferably exposed from the second metal layer 42, and the length L3 is preferably 5 μm or more, and more preferably 10 μm or more. In this arrangement, the over-etching of the first metal layer 41 relative to the second metal layer 42 can be suppressed, and thus the adhesion between the line 40 and the cover layer 60 can be maintained. Even when the second metal layer 42 is formed of copper, the copper can be prevented from oxidizing and degrading.

Figure 6:
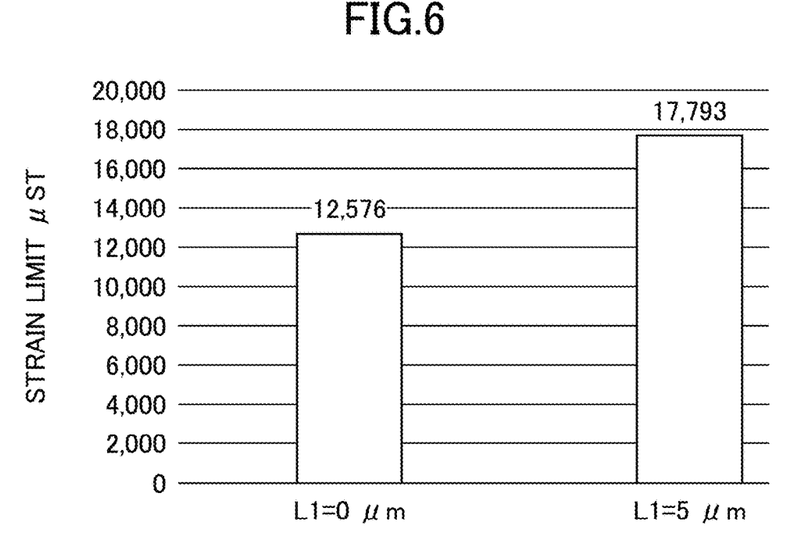
FIG. 6 is a diagram illustrating an experimental result for strain limits.

FIG. 6 is a diagram illustrating an experimental result for strain limits, in which minimum values of the strain limits for a plurality of test strain gauges are plotted. In FIG. 4, L1=0 μm indicates the experimental result for the strain gauge in the comparative example. On the other hand, L1=1 μm indicates the experimental result for the strain gauge 1 according to the first embodiment.

In FIG. 6, the vertical axis expresses the strain limit [μST]. The strain limit indicates a value of mechanical strain at which when strain is applied to the strain gauge, the strain gauge becomes unable to function as a strain gauge due to occurrence of a disconnection. From the result of FIG. 6, it is confirmed that when L1=5 μm, the strain limit is improved by about 1.4 times compared to when L1=0 μm.

According to another study by the inventors, it is not preferable that the second metal layer 42 is not laminated on the first metal layer 41. When the second metal layer 42 is not laminated on the first metal layer 41, the strain limit is further reduced compared to when L1=0 μm illustrated in FIG. 6. For example, when the first metal layer 41 is a Cr composite film, in a case where the line 40 is formed of only the Cr composite film, it is considered that the strain limit is reduced because the Cr composite film has poor elasticity. By laminating, on the first metal layer 41 made of the Cr composite film, the second metal layer 42 made of a material, such as copper, that is superior in elasticity to the Cr composite film, the strain limit can be improved.

That is, from the viewpoint of improving the strain limit, each line 40 is preferably formed of a laminated structure of the first metal layer 41 and the second metal layer 42, and the second metal layer 42 is preferably formed of a material superior in elasticity to the first metal layer 41. That is, the second metal layer is preferably formed of a material that has lower volume resistivity than the first metal layer and that is superior in elasticity to the first metal layer 41. In addition to copper, gold, silver, and aluminum are each used as the material that has lower volume resistivity than the first metal layer and that is superior in elasticity to the first metal layer 41, when the first metal layer is the Cr composite film.

[Method for Manufacturing Strain Gauge]

In the strain gauge 1 according to the present embodiment, the resistor 30, the lines 40, the electrodes 50, and the cover layer 60 are formed on the substrate 10. Another layer (the functional layer described below, or the like) may be formed between the substrate 10 and layers of the above components.

Hereinafter, the method for manufacturing the strain gauge 1 will be described. In order to manufacture the strain gauge 1, first, the substrate 10 is prepared, and a metal layer (for convenience, a metal layer A is used) is formed on the upper surface 10a of the substrate 10. The metal layer A is a layer that is ultimately patterned to serve as the resistor 30, the lines 40, and the electrodes 50. In this arrangement, the material and thickness of the metal layer A are the same as those of the above resistor 30 and the like.

The metal layer A can be formed, for example, by magnetron sputtering that uses a raw material capable of forming the metal layer A as a target. Instead of magnetron sputtering, the metal layer A may be formed by reactive sputtering, vapor deposition, arc ion plating, pulsed laser deposition, or the like.

The metal layer A may be formed after forming a base layer on the upper surface 10a of the substrate 10. For example, a functional layer having a predetermined film thickness may be vacuum-deposited on the upper surface 10a of the substrate 10 by conventional sputtering. By providing the base layer in this manner, gauge characteristics of the strain gauge 1 can be stabilized.

In the present application, the functional layer refers to a layer having a function of promoting crystal growth of at least an upper metal layer A (resistor 30). Preferably, the functional layer further has a function of preventing oxidation of the metal layer A due to oxygen or moisture contained in the substrate 10 and/or a function of improving adhesion between the substrate 10 and the metal layer A. The functional layer may further have other functions.

The insulating resin film that constitutes the substrate 10 may contain oxygen or moisture, and Cr may form an autoxidized film. In this case, especially when the metal layer A includes Cr, it is preferable to deposit a functional layer having a function of preventing oxidation of the metal layer A.

With this arrangement, by providing the functional layer under the metal layer A, crystal growth of the metal layer A can be promoted, and the metal layer A having a stable crystal phase can be produced. As a result, the stability of the gauge characteristics is improved in the strain gauge 1. Moreover, the gauge characteristics are improved in the strain gauge 1 by diffusing a material constituting the functional layer into the metal layer A.

The material of the functional layer may include, for example, one or more metals selected from the group consisting of Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals among the group; or a compound of any metal among the group.

Figure 7:
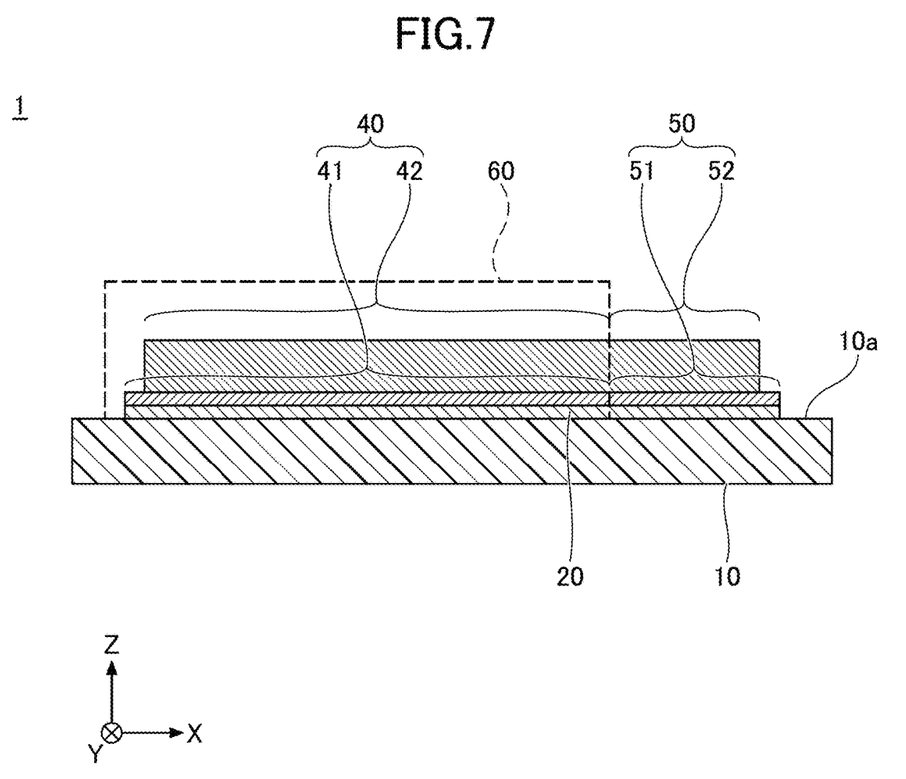
FIG. 7 is a cross-sectional view (part 2) illustrating the strain gauge according to the first embodiment.

FIG. 7 is a cross-sectional view (part 2) illustrating the strain gauge according to the first embodiment. FIG. 7 shows a cross-sectional shape of the strain gauge 1 when a functional layer 20 is provided as an underlayer of the resistor 30, the lines 40, and the electrodes 50.

The planar shape of the functional layer 20 may be patterned to be substantially the same as the planar shape of the resistor 30, the lines 40, and the electrodes 50, for example. However, the planar shape of the functional layer 20 may not be substantially the same as the planar shape of the resistor 30, the lines 40, and the electrodes 50. For example, when the functional layer 20 is formed of an insulating material, the functional layer 20 may be patterned to have a shape different from the planar shape of the resistor 30, the lines 40, and the electrodes 50. In this case, the functional layer 20 may be formed in a solid shape in a region where the resistor 30, the lines 40, and the electrodes 50 are formed, for example. Alternatively, the functional layer 20 may be solidly formed on the entire upper surface of the substrate 10.

Next, second metal layers 42 and second metal layers 52 are formed on the upper surface of the metal layer A. The second metal layers 42 and the second metal layers 52 can be formed into a predetermined pattern by, for example, known photolithography.

Next, a photosensitive resist is formed on the upper surface of the metal layer A, the upper surfaces of the second metal layers 42, and the upper surfaces of the second metal layers 52, and the resist is exposed and developed to pattern into a planar shape that is the same as that of the resistor 30, the lines 40, and the electrodes 50 illustrated in FIG. 1. Then, using the resist as an etching mask, the metal layer A exposed from the resist is removed by wet etching or the like. Next, by removing the resist, the resistor 30, the lines 40, and the electrodes 50 that are in the planar shape illustrated in FIG. 1 can be formed. At this time, the shape of the resist is controlled so that the first metal layers 41 are each not over-etched relative to the second metal layer 42.

After the resistor 30, the lines 40, and the electrodes 50 are formed, the cover layer 60 is formed on the upper surface 10a of the substrate 10 as necessary. The cover layer 60 covers the resistor 30 and the lines 40, but the electrodes 50 may be exposed from the cover layer 60. For example, the cover layer 60 can be formed by: laminating a semi-cured thermosetting insulating resin film on the upper surface 10a of the substrate 10 so as to cover the resistor 30 and the lines 40 and expose the electrodes 50; and then heating and curing the insulating resin film. Through the above process, the strain gauge 1 is completed.

The preferred embodiments and the like are described in detail. However, the strain gauge in the present disclosure is not limited to the above-described embodiments and the like. For example, various modifications and substitutions can be made to the strain gauge according to the above-described embodiments and the like without departing from the scope set forth in the claims.

This international application claims priority to Japanese Patent Application No. 2022-076117, filed on May 2, 2022, the entire contents of which are incorporated herein by reference.

DESCRIPTION OF SYMBOLS 1 strain gauge, 10 substrate, 10a upper surface, 20 functional layer, 30 resistor, $30e_1$, $30e_2$ end, 31 elongated portion, 32 folded portion, 40 line, 41, 51 first metal layer, 42, 52 second metal layer, 50 electrode, 60 cover layer

The invention claimed is:

1. A strain gauge comprising: a substrate; a resistor formed on the substrate; and two lines formed on the substrate and coupled in series to both ends of the resistor, wherein the resistor includes multiple elongated portions, whose longitudinal directions are aligned with a first direction and which are coupled in series with each other, are arranged side by side, wherein a first line of the lines is disposed parallel to a first elongated portion, among the multiple elongated portions, that is located at a first end in a second direction perpendicular to the first direction, wherein the first line is coupled to a first end of the first elongated portion in the first direction, wherein a second line of the lines is disposed parallel to a second elongated portion, among the multiple elongated portions, that is located at a second end in the second direction, wherein the second line is coupled to a first end of the second elongated portion in the first direction, wherein each of the lines includes a first metal layer and a second metal layer that is laminated on the first metal layer and is formed of a material having lower volume resistivity than the first metal layer, wherein in plan view, an outer edge of the first metal layer is exposed from the second metal layer, wherein in plan view, an end of the second metal layer on a first end side in the first direction protrudes further toward the first end side in the first direction than an end of a space that is situated between the first metal layer and a corresponding elongated portion, among the first elongated portion and the second elongated portion, adjacent to the first metal layer.

2. The strain gauge according to claim 1, wherein a length by which the end of the second metal layer on the first end side in the first direction protrudes toward the first end side in the first direction, with respect to the end of the space on the first end side in the first direction, is 1 μm or more.

3. The strain gauge according to claim 2, wherein the length by which the end of the second metal layer protrudes is equal to or greater than a length of each elongated portion of the multiple elongated portions in the second direction.

4. The strain gauge according to claim 3, wherein the length of the elongated portion in the second direction is 5 μm or more.

5. The strain gauge according to claim 1, wherein a length in the first direction between an end of the first metal layer on the first end side in the first direction and the end of the second metal layer on the first end side in the first direction is 5 m or more.

6. The strain gauge according to claim 1, wherein the second metal layer is formed of a material having superior elasticity to the first metal layer.

7. The strain gauge according to claim 1, wherein the first metal layer is integrally formed with the resistor by a same material.

8. The strain gauge according to claim 1, wherein the resistor is formed of a film including Cr, CrN, and $Cr_2N$.

* * * * *